United States Patent [19]
Merkel et al.

[11] Patent Number: 6,161,248
[45] Date of Patent: *Dec. 19, 2000

[54] WIPER BLADE FOR VEHICLE WINDOW PANES

[75] Inventors: Wilfried Merkel, Kappelrodeck; Thomas Kotlarski, Buehlertal; Juergen Reiss, Ingolstadt, all of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/101,131
[22] PCT Filed: Aug. 23, 1997
[86] PCT No.: PCT/DE97/01839
§ 371 Date: Jun. 30, 1998
§ 102(e) Date: Jun. 30, 1998
[87] PCT Pub. No.: WO98/19899
PCT Pub. Date: May 14, 1998

[30] Foreign Application Priority Data

Nov. 2, 1996 [DE] Germany .............. 196 45 170

[51] Int. Cl.[7] .................................................. B60S 1/40
[52] U.S. Cl. ................................. 15/250.32; 15/250.43
[58] Field of Search ............... 15/250.361, 250.43, 15/250.32, 250.44, 250.33, 250.41

[56] References Cited

U.S. PATENT DOCUMENTS

| | | | |
|---|---|---|---|
| 2,642,613 | 6/1953 | Krohm | 15/250.32 |
| 2,761,169 | 9/1956 | Krohm | 15/250.32 |
| 2,974,341 | 3/1961 | Hart | 15/250.32 |
| 3,132,367 | 5/1964 | Wise | 15/250.43 |
| 3,179,969 | 4/1965 | Glynn | 15/250.32 |
| 3,393,421 | 7/1968 | Wise | 15/250.32 |
| 4,014,061 | 3/1977 | Jurowski et al. | 15/250.43 |
| 4,028,770 | 6/1977 | Appel | 15/250.43 |
| 5,383,248 | 1/1995 | Ho | 15/250.32 |
| 5,715,563 | 2/1998 | Marks | 15/250.361 |

FOREIGN PATENT DOCUMENTS 1 241 161 12/1967 Germany .
26 14 457 10/1976 Germany .

*Primary Examiner*—Gary K. Graham
*Attorney, Agent, or Firm*—Michael J. Striker

[57] ABSTRACT

A proposed wiper blade serves to clean the windshields of motor vehicles. The wiper blade (10) has an elongated rubber-elastic wiping strip which can be placed in contact against the windshield to be wiped and which is held substantially parallel to the longitudinal axis at an elongated, springing-elastic carrying element (12). A connection device (16) for complementing connection means of a driven wiper arm (18) which are loaded toward the windshield is arranged at the center portion of the carrying element (12). The connection device has two stop surfaces (36) which are located at a distance from one another, extend transverse to the driving direction, are parallel to one another and oriented in planes extending vertical to the windshield, and cooperate with counter-stops of the wiper arm. A problem-free and economical arrangement of the connection device at the carrying element is carried out in that one of the two structural component parts (12 or 16) which are connected with one another is provided with elastically deflectable catch means which cooperate with the complementing catch means of the other structural component part (16 or 12) in such a way that the two structural component parts are locked together.

11 Claims, 4 Drawing Sheets

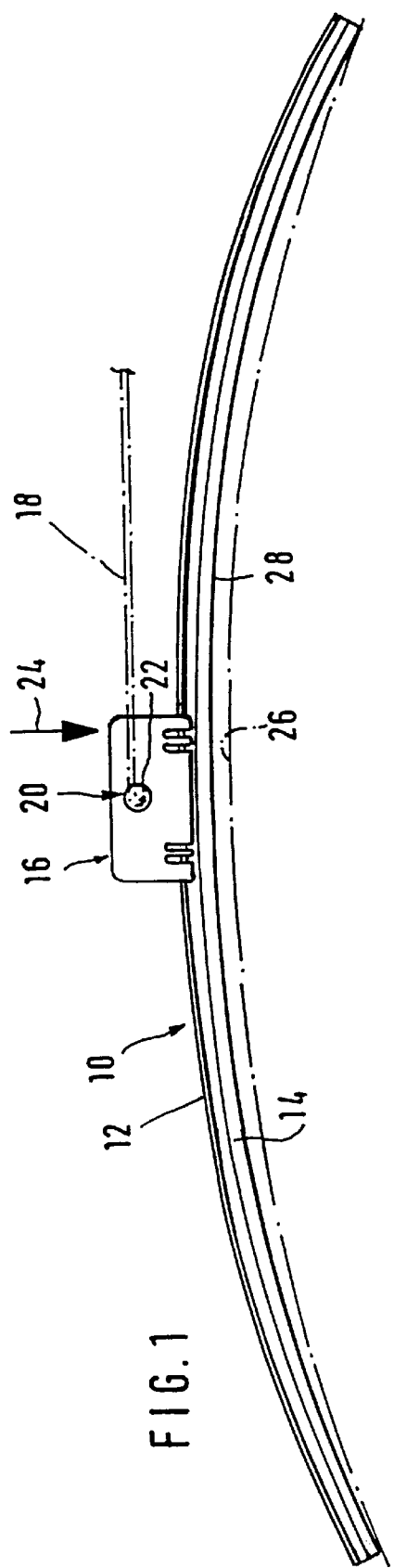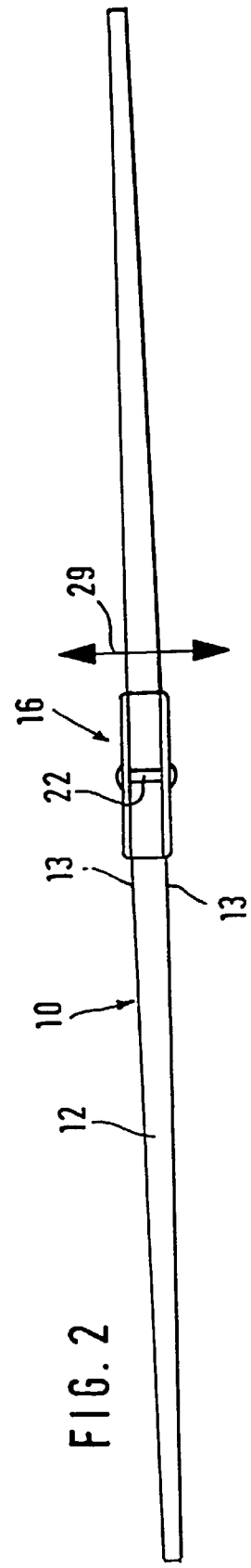

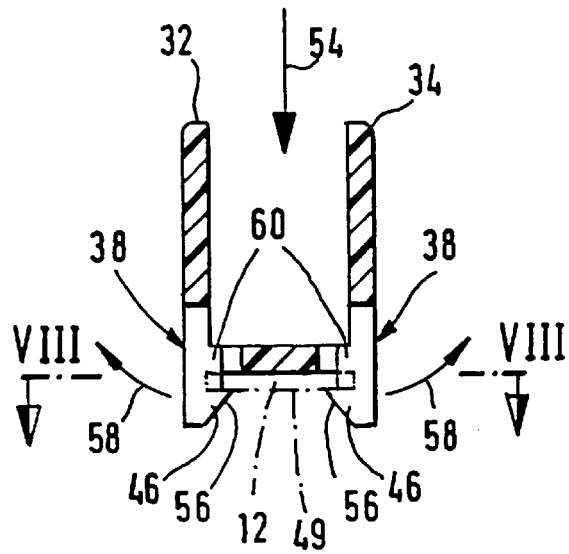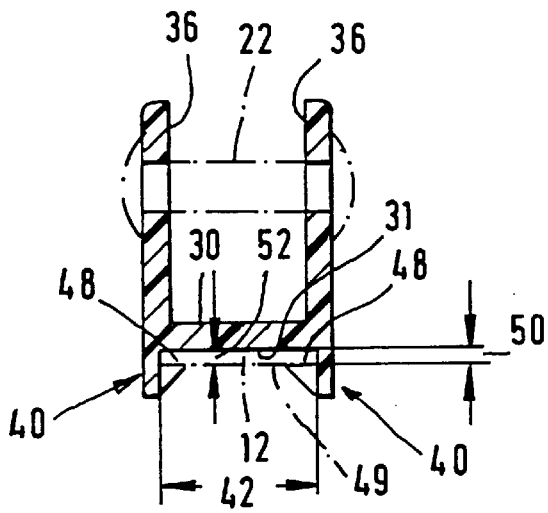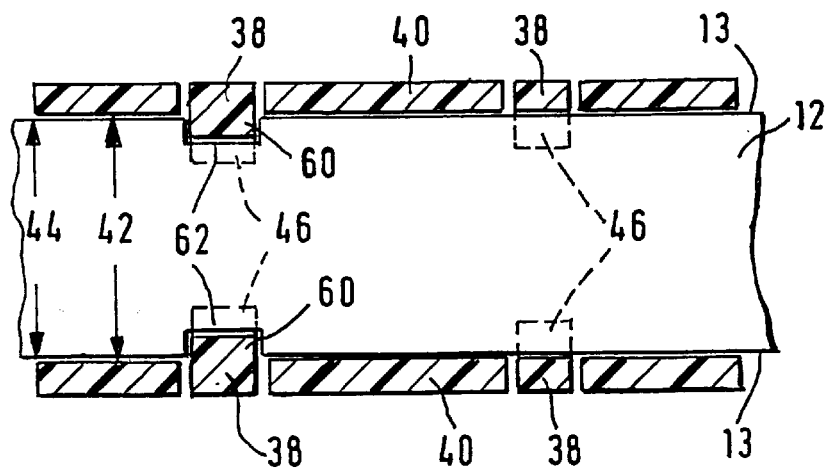

WIPER BLADE FOR VEHICLE WINDOW PANES

BACKGROUND OF THE INVENTION

The present invention relates to wiper blades for motor vehicle windows.

In wiper blades the carrying element should ensure that the pressure exerted by the wiper arm to press the wiper blade against the windshield is distributed as uniformly as possible over the entire wipe field wiped by the wiper blade. Due to a corresponding curvature of the carrying element when it is not loaded—that is, when the wiper blade does not rest against the windshield—the ends of the wiping strip which rests in its entirety against the windshield during operation of the wiper blade are loaded toward the windshield by the carrying element which is now tensioned, even though the radii of curvature of spherically curved vehicle windshields change in every position of the wiper blade. Therefore, the curvature of the wiper blade must be somewhat greater than the greatest curvature measured in the wipe field of the windshield to be wiped. The carrying element accordingly replaces the elaborate carrying clip construction by two spring rails which are arranged in the wiping strip as is conventional practice in wiper blades.

In a known wiper blade of this type (DE 26 14 457 A1), the stop surfaces are arranged at shoulders that are connected integral with the carrying element and that belong to the apparatus for connecting the wiper blade to the driven wiper arm. These shoulders are accordingly made from the same material as the carrying element. This may possibly be of secondary importance provided that the carrying element is made from plastic and is therefore manufactured, along with the shoulders, by filling an appropriate mold. However, if the carrying element is produced from metal, there are two diametrically opposed requirements. Namely, on the one hand, the carrying element should have good spring characteristics, but the shoulders, on the other hand, should be easily bent out of the plane of the carrying element by approximately 90 degrees and fixed in this position so that the loading occurring during operation between the wiper blade and wiper arm can be absorbed at the stop surfaces. These two requirements can scarcely be met in practice without disadvantageous compromises with respect to the selection of material.

In another known wiper blade (DE 12 47 161), the carrying element is provided with a connection device formed as a separate structural component part. This connection device is fixedly connected with the carrying element by means of rivets. However, the bore holes which are required in the carrying element for this purpose, the rivets being seated therein so as to be mechanically clamped, lead to an uncontrollable, and hence unwanted, change in the tensioning of the carrying element, so that satisfactory wiping results cannot be achieved.

SUMMARY OF THE INVENTION

It is an object of the present invention to provide a wiper blade which avoids the disadvantages of the prior art.

In keeping with these objects, one feature of present invention resides, briefly stated, in a wiper blade in which the two structural component parts are provided with different catch means, including a first elastically deflatable catch means and a second complementing catch means so that the structural component parts are locked together by the two catch means.

In the wiper blade constructed in accordance with the, present invention a selection of material can be made with respect to the carrying element and the connection device which meets the respective demands of each structural component part. The two structural component parts are connected with one another economically in that one structural component part locks onto the other structural component part in a simple manner, wherein the catch means of one structural component part engage with the complementing catch means of the other structural component part, so that proper locking is carried out.

For reasons relating to manufacturing technique, it can be advantageous to arrange the catch means at the connection device.

According to a further development of the invention in which the catch means have at least one catch shoulder lying in a plane at least approximately parallel to the windshield surface and a complementing catch shoulder of the carrying element is associated with this catch shoulder, the forces occurring during the working movement of the wiper blade do not act in the direction of the locking forces, so that a durable and dependable connection is ensured between the carrying element and connection device.

A precise arrangement of the connection device at the carrying element, viewed in the longitudinal direction of the carrying element, is achieved when the catch means have at least one retaining shoulder which is arranged transverse to the longitudinal extension of the carrying element and a complementing retaining shoulder of the carrying element is associated with this retaining shoulder.

The catch shoulder or retaining shoulder is advantageously arranged at the free end of a tongue which is arranged at the connection device and spring-loaded in the direction of the carrying element.

These catches can be realized without an especially elaborate construction in that the complementing catch shoulder or complementing retaining shoulder associated, respectively, with the catch shoulder and retaining shoulder is formed by a notch or cutout at the carrying element.

In this respect, a further simplification of the wiper blade construction is achieved in that the connection device is manufactured from a resilient or elastic plastic and the tongue is connected integral with the connection device.

When the connection device has two cheeks which are located at a distance from one another, extend transverse to the driving direction, are parallel to one another and oriented in planes vertical to the windshield, the catch means are advisably connected with the cheeks of the connection device.

A reliably operating construction of the connection device is provided in that the connection device has a substantially U-shaped cross section viewed transverse to the longitudinal extension of the wiper blade, wherein the base of the "U" contacts the carrying element and the legs of the "U" form the cheeks.

When each of the cheeks has a striplike extension extending beyond the base of the "U", wherein the distance between these striplike extensions, measured in the working direction of the wiper blade, is adapted to the width of the carrying element, measured in the working direction, in the mounted position, the connection device is guided precisely at the carrying element and the forces acting on the two interconnected structural component parts during the operation of the wiper blade are safely transmitted without impairing the catch connection.

The fastening catch arrangement can be realized in a particularly simple manner in that at least one tongue which can be deflected out of the plane of the legs of the "U" is formed on at least one of the two U-legs of the connection device, this tongue extending into the region of the striplike extensions of the U-legs, wherein a catch hook is arranged with the catch shoulder facing the base of the "U" at the free end of the tongue located in the above-mentioned region, and the spacing between the catch shoulder and the U-base is adapted to the thickness of the carrying element. In this way, the underside of the carrying element remote of the connection device is utilized as a complementing catch shoulder. Additional constructions in this respect can be dispensed with.

In special cases, it may be advantageous in the case of a connection device having a base plate which can be placed on the upper side of the carrying element to arrange the catch means at this base plate. In this case, the catch means can be arranged at the free end of a tongue which is connected with the base plate and spring-loaded in the direction of the carrying element and can be formed by a projection which faces the carrying element and has the retaining shoulder.

In this case, an economical catch connection results when the complementing retaining shoulder facing the retaining shoulder is formed by a cutout at the carrying element.

A very good guidance of the connection device at the carrying element can be achieved according to a further construction of the invention in that the connection device has, on the side of its base plate facing the windshield, at least two guide strips extending in the direction of the longitudinal axis of the carrying element and having an L-shaped cross section, wherein the L-legs remote of the base plate are directed toward one another in a clawlike manner, wherein the distance between the other L-legs is adapted to the width of the carrying element and the distance between the first L-legs and the base plate are adapted to the thickness of the carrying element.

Other advantageous further developments and constructions of the invention are indicated in the following description and embodiment examples shown in the accompanying drawings.

BRIEF DESCRIPTION OF THE DRAWINGS

FIG. 1 shows a side view of a wiper blade according to the invention;

FIG. 2 shows a top view of the wiper blade according to FIG. 1;

FIG. 6 shows a section through the connection device along line VI—VI in FIG. 3;

FIG. 7 shows a section through the connection device according to line VII—VII in FIG. 3;

FIG. 8 is an enlarged view showing a section according to line VII—VIII in FIG. 6 through the connection device, including a center piece of the carrying element;

DESCRIPTION OF THE PREFERRED EXAMPLE

Figure 3:
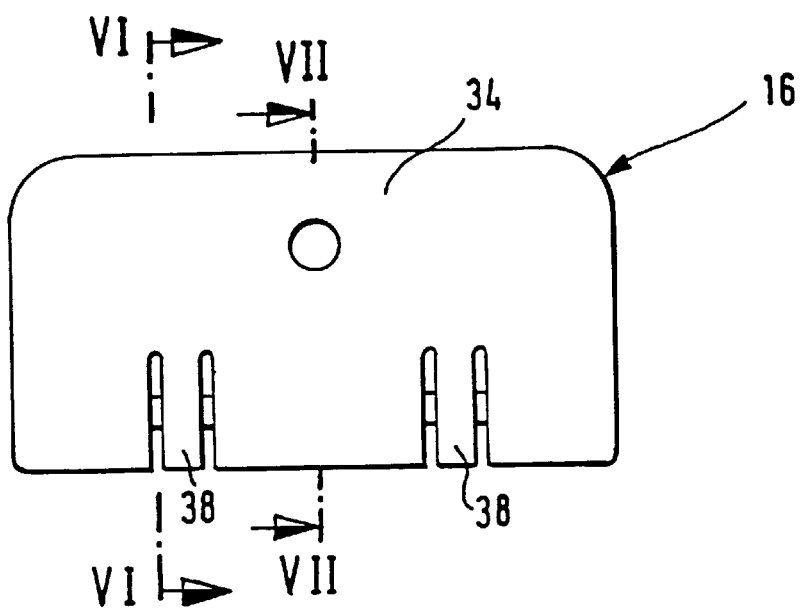
FIG. 3 shows a side view of a connection device belonging to the wiper blade for a driven wiper arm.
Figure 4:
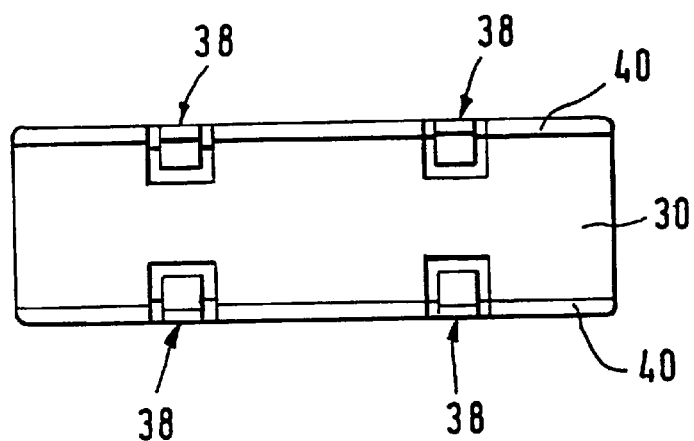
FIG. 4 is a bottom view of the connection device according to FIG. 3.
Figure 5:
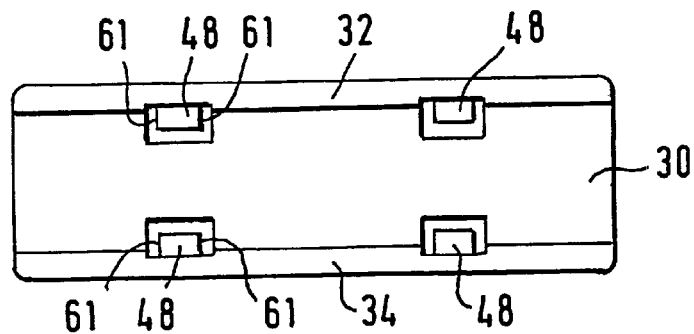
FIG. 5 is a top view of the connection device according to FIG. 3.

A wiper blade 10 shown in FIGS. 1 and 2 has an elongated springing-elastic carrying element 12, at whose underside is fastened a rubber-elastic wiping strip 14. A connection device 16 by means of which the wiper blade 10 can be detachably connected with a driven wiper arm 18 is arranged at the upper side of the carrying element 12. A hook serving as complementing connection means is formed integral with the free end 20 of the wiper arm 18 and engages around an articulated pin 22 associated with the connection device 16 of the wiper blade. The wiper arm 18 and wiper blade 10 are secured to one another by securing means, known per se, which are constructed as an adapter and are not shown in more detail. The wiper arm 18, and therefore also the hook at the end 20, is loaded in the direction of arrow 24 (FIG. 1) in the direction of the windshield to be wiped, whose wipe surface is shown in FIG. 1 by a dash-dot line 26. Since the dash-dot line 26 represents the greatest curvature of the windshield surface, it can clearly be seen that the curvature of the wiper blade contacting the windshield by both ends is greater than the maximum windshield curvature. The wiper blade 10 contacts the windshield surface 26 by its wiping lip 28 along the entire length of the wiper blade 10 under contact pressing pressure (arrow 24). In this respect, a tension is formed in the springing-elastic carrying element 12 which provides for proper contact of the wiping strip 14 and its wiping lip 28 against the windshield over the entire length of the wiping strip 14, so that the wiping lip 18 always remains in contact with the windshield surface 26 when the wiper blade is moved in the direction of the double arrow 29 (FIG. 2).

The connection means for fastening the connection device 16 to the carrying element 12 will first be described in the following with reference to FIGS. 3 to 8.

The connection device 16 arranged at the upper side of the carrying element 12 remote of the windshield surface 26 has a substantially U-shaped cross section. It thus has a U-base 30 and two U-legs 32, 34 which are arranged at a distance from one another and are oriented vertical to the U-base 30, the wiper arm 18 being arranged between these two U-legs 32, 34 when the wiper blade is operated. This wiper arm 18 engages around the articulated pin 22 (FIG. 7) by its hook-shaped free end 20. The wiper arm 18 fits between the U-legs 32, 34, so that it contacts the mutually facing cheeks 36 of the U-legs 30, 32 with its side surfaces which form counter-stops. In this way, the driving movement of the wiper arm 18 is transmitted to the wiper blade 10 in proper fashion. The connection device 16 is manufactured from an elastic plastic. As is shown especially in FIGS. 3 to 5, two deflectable tongues 38 which are arranged opposite one another in pairs are cut out at each U-leg 32 and 34 and are connected at one end with the U-legs 32 and 34, respectively, to form one piece. The U-legs 32, 34 continue in striplike extensions 40 at the side of the U-base 30 remote of the U-legs 32; 34. These striplike extensions 40 are located at a distance 42 from one another which is adapted to the width 44 of the carrying element 12 (FIG. 8). This results in a flawless lateral guide for the connection device 16 at the carrying element 12 when this connection device 16 is placed on the carrying element 12 in accordance with FIGS. 1 and 2. The tongues 38 which are formed by removal of material extend from the U-legs 32, 34 to the region of the striplike extensions 40 (FIG. 6). A catch tooth 46 which extends from one tongue 38 toward the other tongue of the same pair of tongues is arranged at each free end of the striplike extensions 40. Each catch tooth has a catch shoulder 48 which faces the underside of the U-base 30 of the connection device 16 and lies substantially in a plane parallel to the windshield to be wiped (FIG. 7). The distance 50 between the catch shoulder 48 and the underside 31 of the U-base 30 facing this catch shoulder 48 is adapted to the thickness 52 of the carrying element 12 (FIG. 7).

When the connection device 16 is placed on the carrying element 12 in the direction of arrow 54 in FIG. 6, the side edges 13 of the carrying element 12 (FIG. 2) press against stop bevels 56 of the catch teeth 46, so that the latter are temporarily deflected in the direction of arrows 58 (FIG. 6) until the carrying element 12 has reached its mounting position shown in dash-dot lines in FIGS. 6 and 7. Since the connection device 16 and accordingly also the tongues 38 are made of elastic plastic, the tongues 38 subsequently spring back to their initial position in the opposite direction of arrows 58, wherein the catch shoulders 48 of the catch teeth 46 engage under the strip-shaped carrying element 12 and secure the latter at the connection device 16 in such a way that it is no longer possible for these two parts to separate from one another in the opposite direction of the arrow 54. Accordingly, the tongues 38, together with their catch teeth 46 and the catch shoulders 48 arranged at the latter, form catch means and the underside 49 of the carrying element 12 forms complementing catch means which cooperate with the catch means, so that the two parts are reliably fastened together. To ensure a reliable locking of the connection device 16 at the carrying element 12 in the longitudinal direction of the carrying element 12 as well, two tongues 38 are provided in the embodiment example with thickened portions 60 which are directed inward, that is, toward one another (FIGS. 6 and 8), wherein cutouts 62 with open edges which are arranged at the carrying element 12 are associated with these thickened portions 60. When the connection device 16 is properly oriented at the carrying element 12, the thickened portions 60 of the tongues 38 enter the cutouts 62 (FIG. 8) when the tongues 38 spring back again into their initial position shown in FIG. 6. Thus, together with the thickened portions 60, the cutouts 60 form a locking catch arrangement, wherein the surfaces 61 of the thickened portions 60 facing in the longitudinal direction of the carrying element 12 form retaining shoulders. The edges of the cutouts 62 facing these retaining shoulders form the complementing retaining shoulders of this locking catch arrangement.

Another embodiment form of the invention will now be described with reference to FIGS. 9 to 12. The connection device shown in a side view in FIG. 9 has been provided with reference number 116. It likewise has a U-shaped cross section and is manufactured from springing-elastic material, preferably plastic.

Figure 9:
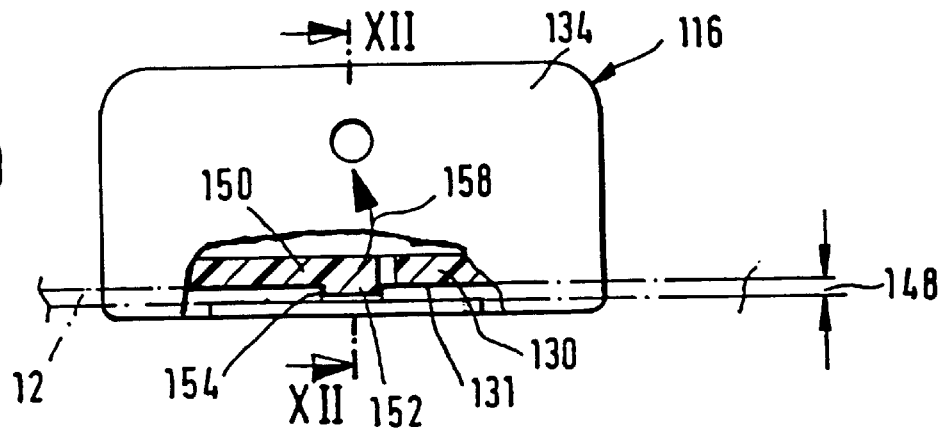
FIG. 9 is a side view of a different construction of the connection device in partial section along line IX—IX in FIG. 11.
Figure 10:
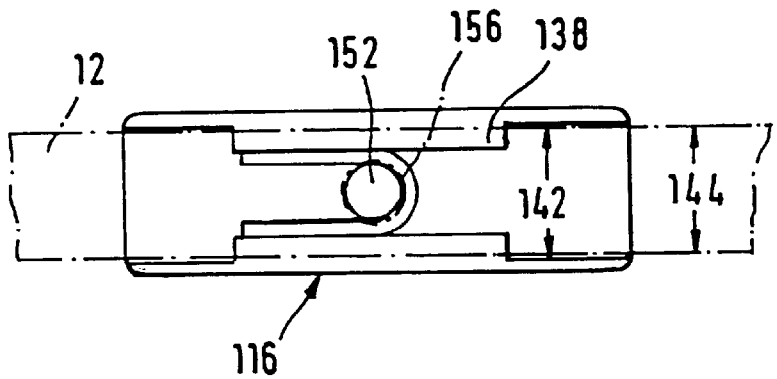
FIG. 10 is a bottom view of the connection device according to FIG. 9.
Figure 11:
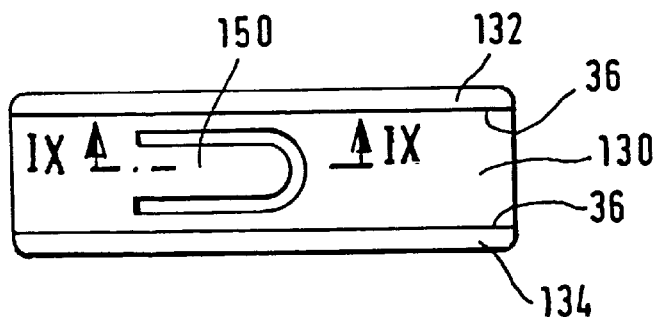
FIG. 11 is a top view of the connection device according to FIG. 9.
Figure 12:
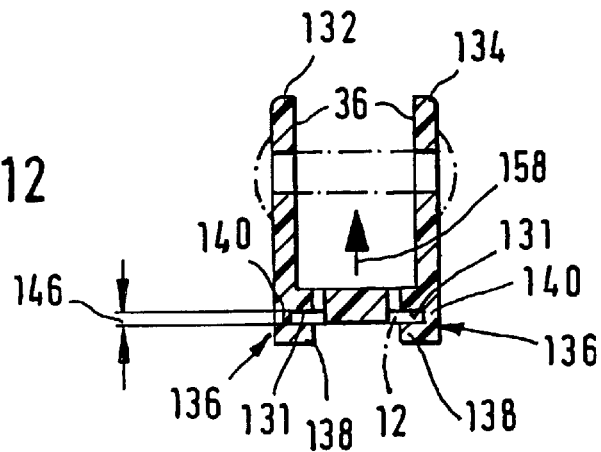
FIG. 12 shows a section through the connection device according to FIG. 9 along line XII—XII.

Thus, it likewise has a U-base 130 and accordingly also two U-legs 132 and 134 whose side faces which are directed toward one another form the cheeks 36. in this embodiment example also, the U-legs 132, 134 are guided beyond the U-base 130 serving as a base plate. These extensions are constructed as strips 136 which are L-shaped in cross section. The L-legs 138 of the strips 136 are directed toward one another and are connected, by way of the other L-legs 140, with the U-shaped body of the connection device 116 so as to be integral therewith. The L-shaped strips 136 are constructed in such a way that the distance 142 between the L-legs 140 is adapted to the width 144 of the carrying element 12 (FIG. 10). The distance 146 between one L-leg 138 and the underside 131 of the U-base 130 facing this L-leg 138 is adapted to the thickness 148 of the strip-shaped carrying element 12 (FIGS. 9 and 12). Accordingly, as is shown in FIGS. 9, 10 and 12, a slidelike guide results for the connection device 116 on the carrying element 12. Thus, the connection device 116 can be slid onto the carrying element in the longitudinal direction of the latter, wherein the L-shaped strips 136 together with the U-base 130 of the connection device 116 serving as a base plate form a guidance on all sides relative to the carrying element 12.

In order to lock the connection device 16 at the carrying element 12 in the longitudinal direction of the latter, the U-base 130 of the connection device 116 is provided with a cut out tongue 150 which can deflect in a resilient manner and which is connected in one piece with the connection device 116. A pin 152 which projects from the U-base toward the carrying element 12 is arranged at the free end of the tongue 150. The outer surface 154 of the pin 152 forms a retaining shoulder having a complementing retaining shoulder at the carrying element 12. In the embodiment example, this complementing retaining shoulder is formed by the wall surface of a bore hole 156 in the carrying element 12 (FIG. 10). The arrangement between the pin 152 and the bore hole 156 is effected in such a way that the connection device 116 is in its proper mounting position when the pin 152 fits in the bore hole 156.

The assembly of the connection device 116 at the carrying element 12 is described hereinafter with reference to FIGS. 9 and 10. The connection device 116 is slid onto the carrying element 12 in the longitudinal direction of the latter. The carrying element 12 lies in the slidelike guide which is formed by L-shaped strips 136. When the carrying element 12 is slid through the slide guide of the connection device 116, the tongue 150 is deflected in the direction of arrow 158 until the pin 152 releases the slide guide. After achieving the proper mounting position, the tongue 150 which is now pretensioned springs back along with the pin 152 into its initial position shown in FIG. 9, wherein the pin 152 enters the bore hole 156 associated with it. The outer surface 154 of the pin 152 now cooperates with the outer surface of the bore hole 156 in the manner of retaining shoulders and complementing retaining shoulders.

It will now be clear with reference to the preceding description that one of the structural component parts 12 and 16 which are connected with one another is provided with catch means 38, 46 or 150, 152 which can deflect in an elastic manner and which cooperate with complementing catch means 12 of the other structural component part 16 or 12 in such a way that the two structural component parts 12 and 16 are fastened together.

While the carrying element 12 in the embodiment examples is constructed in one piece, it may also be formed of a plurality of parts without exceeding the scope of the present invention.

What is claimed is:

1. Wiper blade (10) for windshields of motor vehicles, said blade adapted to be driven over the windshield in a driving direction, said blade having an elongated rubber-elastic wiping strip (14) which can be placed in contact against the windshield to be wiped and which is held substantially parallel to and along a longitudinal axis directly by an elongated, springing-elastic carrying element (12) as a first structural component part, said carrying element is elongated between first and second ends thereof and has an upper and lower side, a connection device (16) for complementing connection means (20) of a driven wiper arm (18) being arranged as a further structural component part at a center portion of the carrying element (12), wherein the connection device (16) has at least one stop surface (36) which cooperates with at least one counter-stop of the wiper arm (18), the two structural parts (12,16) which are connected with one another have two catch means arranged so that the connection device (16) is provided with first elastically deflectable catch means which cooperate with second complementing catch means of the carrying element (12) in such a way that the two structural component parts (12,16) are locked together, the first elastically deflectable catch means comprising at least one deflectable tongue defining a retaining shoulder and the second catch means comprising a cutout in said carrying element which defines a catch shoulder, characterized in that the springing elastic carrying element (12) has a lower surface in continuous contact all along its length between the first and second ends with a back surface of the elongated rubber-elastic wiping strip.

2. Wiper blade according to claim 1, characterized in that the retaining shoulder is arranged transverse to the longitudinal extension of the carrying element, and in that the catch shoulder complements the retaining shoulder.

3. Wiper blade according to claim 1, characterized in that the retaining shoulder is arranged at the free end of the tongue and spring-loaded in the direction of the carrying element (12).

4. Wiper blade according to claim 3, characterized in that the connection device (16) is manufactured from an elastic plastic, and in that the tongue (38) is connected integral with the connection device (16).

5. Wiper blade according to claim 1, characterized in that the connection device (16) has two cheeks which are located at a distance from one another, extend transverse to the driving direction, are parallel to one another and oriented in planes vertical to the windshield, wherein the catch means of the connection device (16) are connected with the cheeks.

6. Wiper blade according to claim 5, characterized in that each of the cheeks (32, 34) has a strip-shaped extension (40) extending beyond a U-base (30), wherein the distance (42) between these strip-shaped extensions (40), measured in the driving direction (29) of the wiper blade (10), is adapted to the width (44) of the carrying element (12) measured in the driving direction.

7. Wiper blade according to claim 6, characterized in that said at least one tongue (38) is formed on at least one of the two U-legs (32, 34) of the connection device (16), this tongue (38), which can be deflected out of the plane of a respective U-leg, extending into a region of the strip-shaped extensions (40) of the U-legs, in that a catch hook is arranged with the catch shoulder (48) facing the base of the "U" at the free end of the tongue located in the above-mentioned region, and in that the spacing between the catch shoulder and the U-base is adapted to the thickness of the carrying element.

8. Wiper blade according to claim 1, characterized in that the connection device (16) has a base plate (30) which can be placed on the upper side of the carrying element (12), said catch means (150, 152) of the connection device (16) being provided on this base plate (30).

9. Wiper blade according to claim 8, characterized in that the tongue (150) is connected with the base plate (30) and spring-loaded in the direction of the carrying element (12) and includes a projection (152) which faces the carrying element and has the retaining shoulder (154) therein.

10. Wiper blade (10) for windshields of motor vehicles, with an elongated rubber-elastic wiping strip (14) which can be placed in contact against the windshield to be wiped and which is held substantially parallel to a longitudinal axis directly by an elongated, springing-elastic carrying element (12) as a first structural component part, a connection device (16) for complementing connection means (20) of a driven wiper arm (18) which are loaded toward the windshield being arranged as a further structural component part at the center portion of the carrying element (12), wherein the connection device (16) has two stop surfaces (36) which are located at a distance from one another, extend transverse to a driving direction, are parallel to one another and oriented in planes extending vertical to the windshield, and cooperate with counter-stops of the wiper arm (18), characterized in that the two structural parts (12, 16) which are connected with one another have two catch means arranged so that one of the two structural component parts (12 or 16) is provided with first elastically deflectable catch means which cooperate with second complementing catch means of the other structural component part (16 or 12) in such a way that the two structural component parts (12 and 16) are locked together, the connection device (16) has two cheeks which are located at a distance from one another, extend transverse to the driving direction, are parallel to one another and oriented in planes vertical to the windshield, wherein catch means of the connection device (16) are connected with the cheeks, characterized in that the connection device (16) has a substantially U-shaped cross section viewed transverse to the longitudinal extension of the wiper blade (10), wherein the base (30) of the "U" contacts the carrying element (12) and the legs (32, 34) of the "U" form the cheeks.

11. Wiper blade (10) for windshields of motor vehicles, with an elongated rubber-elastic wiping strip (14) which can be placed in contact against the windshield to be wiped and which is held substantially parallel to a longitudinal axis directly by an elongated, springing-elastic carrying element (12) as a first structural component part, a connection device (16) for complementing connection means (20) of a driven wiper arm (18) which are loaded toward the windshield being arranged as a further structural component part at the center portion of the carrying element (12), wherein the connection device (16) has two stop surfaces (36) which are located at a distance from one another, extend transverse to a driving direction, are parallel to one another and oriented in planes extending vertical to the windshield, and cooperate with counter-stops of the wiper arm (18), that the two structural parts (12, 16) which are connected with one another have two catch means arranged so that one of the two structural component parts (12 or 16) is provided with first elastically deflectable catch means which cooperate with second complementing catch means of the other structural component part (16 or 12) in such a way that the two structural component parts (12 and 16) are locked together, the first catch means are arranged at the connection device, the connection device (16) has a base plate (30) which can be placed in the upper side of the carrying element (12), said first catch means (150, 152) of the connecting device (16) being arranged at the base plate (30); the catch means (152) are arranged at the free end of a tongue (150) which is connected with the base plate (30) and spring-loaded in the direction of the carrying element (12) and are formed by a projection (152) which faces the carrying element and has a retaining shoulder (154); the complementing retaining shoulder facing the retaining shoulder (154) is formed by a cutout (156) at the carrying element (12); characterized in that the connection device (16) has, on the side of its base plate (30) facing the windshield, at least two guide strips (136) which extend in the direction of the longitudinal axis of the carrying element and are L-shaped in cross section, wherein first L-legs (138) remote of the base plate (30) are directed toward one another in a claw-shaped manner, wherein the distance between other second L-legs (140) is adapted to the width (144) of the carrying element (12), and the distance (146) between the first L-legs (138) and the base plate (30) are adapted to the thickness (148) of the carrying element (12).

* * * * *